J. HARRINGTON.
Cotton-Seed Huller.
No. 110,134. Patented Dec. 13, 1870.
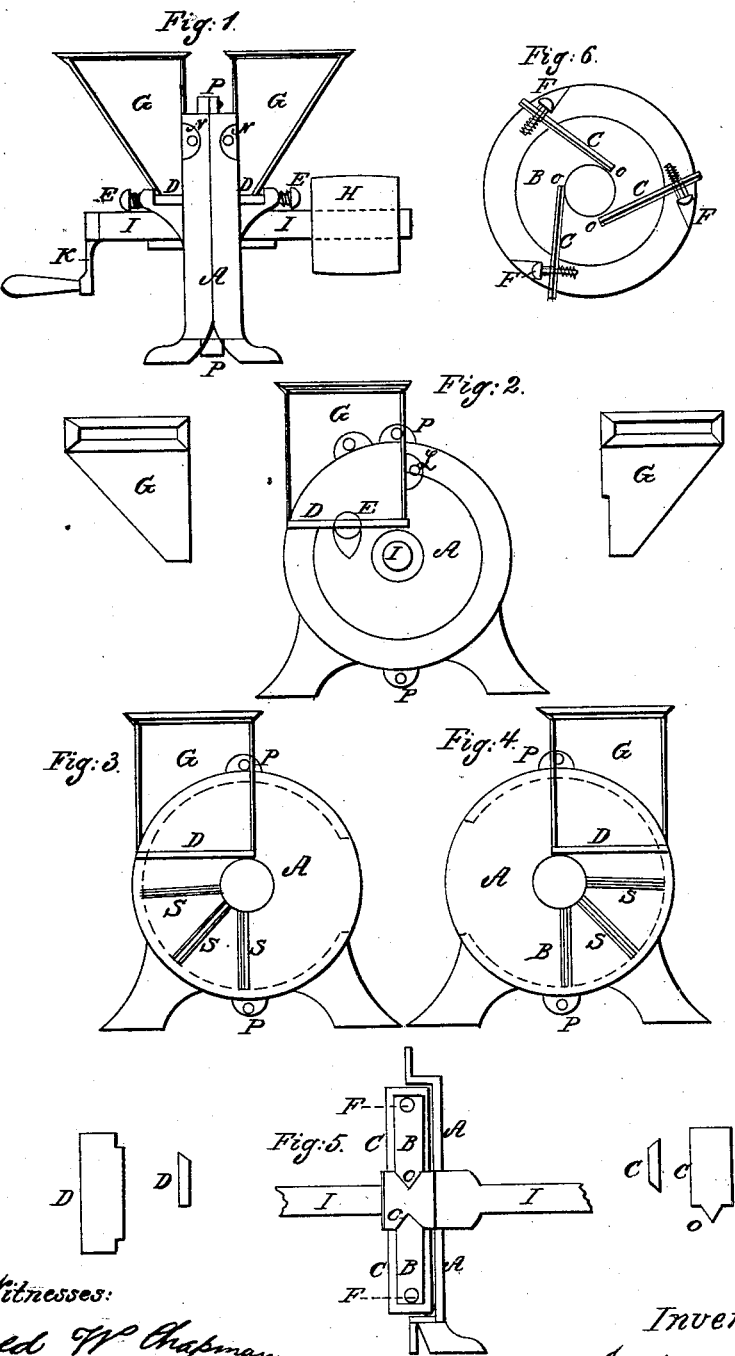

United States Patent Office.

JACKSON HARRINGTON, OF NEW LONDON, CONNECTICUT, ASSIGNOR TO HIMSELF, RALPH WHEELER, AND JONATHAN DART, OF SAME PLACE.

Letters Patent No. 110,134, dated December 13, 1870.

IMPROVEMENT IN COTTON-SEED HULLERS.

The Schedule referred to in these Letters Patent and making part of the same.

I, JACKSON HARRINGTON, of the town and county of New London and State of Connecticut, have invented certain Improvements in Machines for Hulling Cotton-Seed, of which the following is a specification.

The nature of my invention consists in the arrangement of a revolving cutter-head within a case or shell.

The cutter-head is provided with one or more cutters, which are firmly secured in the revolving head, extending nearly in a radial line from a point near the center of the head, to its outer edge, and projecting on each side of the head sufficiently to catch and cut the cotton-seeds, as hereinafter described.

The shell is constructed in any proper manner and form, so as to inclose the revolving cutter-head, with openings upon each side of the shell, to which hoppers are fitted, so as to supply the cotton-seed into the shell, against each side of the cutter-head.

A suitable opening is also made in the edge of the opposite part of the shell, for the discharge of the hulled seeds by the centrifugal action of the revolving head.

At the bottom of the hoppers, upon each side of the shell, adjustable knives are fixed, extending through the side of the shell, and meeting the cutters in the revolving head at a proper angle, so that the seeds are cut by the knives and cutters in like manner as the cutting edges of the ordinary shears.

Upon each side of the interior of the shell, between the above-described knives and the opening through which the seeds are discharged, are flat radial bars or projections, for the purpose of more effectually separating the kernels previous to the discharge of the seeds.

In the accompanying drawings—

Figure 1 is a side view of the machine, showing the driving-shaft I, adapted either for hand or other power.

Figure 2 is a view of one of the exterior sides of the shell A, showing the hopper G in position, and the screws P P, by which the two parts of the shell are secured together.

Figures 3 and 4 are views of the interior of the left and right parts of the shell, showing the position of the radial bars S S S S S S and the knives D D.

Figure 5 is a sectional view of the cutter-head B, and of one side of the shell A.

Figure 6 is a side view of the cutter-head, showing the cutters C C C in position.

The figures upon the right and left of fig. 5 are side and sectional views of the cutters C and of the knives D.

A is the shell or case of the machine, substantially constructed in two parts, secured together by the screws P P.

B is the cutter-head, which may be made of any diameter, and should be of sufficient thickness to firmly hold the cutters.

C C C are the cutters, which should be wide enough to project on each side of the head sufficiently to cut the seeds, and may be made V-shaped at the inner end o, to secure them from any lateral movement, and by means of the screws F F F they are firmly and immovably fixed in the head, their outer ends being set forward of radii of the head, as shown in fig. 6, so as to facilitate the cutting of the seeds.

The outer ends of the cutters also project beyond the edge of the head, so as to keep the shell clear.

D D are adjustable knives, placed in each side of the shell, and are securely clamped between suitable projections from each side of the shell, and the base of the hoppers, which are pressed tightly upon the knives by the screws N N, fig. 1.

E E are set-screws, by which the knives are adjusted close to the revolving cutters.

G G are the hoppers, which are pivoted to the shell by the screws L L, and when clamped upon the knives by the screws N N they are firmly held to the shell A.

H is the driving-pulley, and I the shaft, passing through suitable bearings in the shell, by which motion is given to the cutter-head.

I claim as my invention—

1. The cutter-head B, provided with one or more double-edged cutters C, fastened by the V-shaped end o, and screws F, substantially as herein shown and described, for the purposes set forth.

2. The adjustable knives D D, forming the bottom of the hoppers G G, in combination with the cutter-head B, when constructed and arranged substantially as herein shown and described, for the purposes set forth.

3. The combination of the shell A, provided with the bars S, with the cutter-head B, knives D D, and hoppers G G, all constructed and arranged substantially as herein shown and described, for the purposes set forth.

JACKSON HARRINGTON.

Witnesses:
ALFRED W. CHAPMAN,
WM. F. DOUGLASS.